M. BOWMAN.
DOUGH MIXER AND RAISER.
APPLICATION FILED JULY 25, 1908.

917,921.

Patented Apr. 13, 1909.
2 SHEETS—SHEET 1.

Witnesses:
Darwin Seymour
Wm. E. Smith

Inventor:
Milo Bowman.
By Joshua R. H. Potts,
Atty.

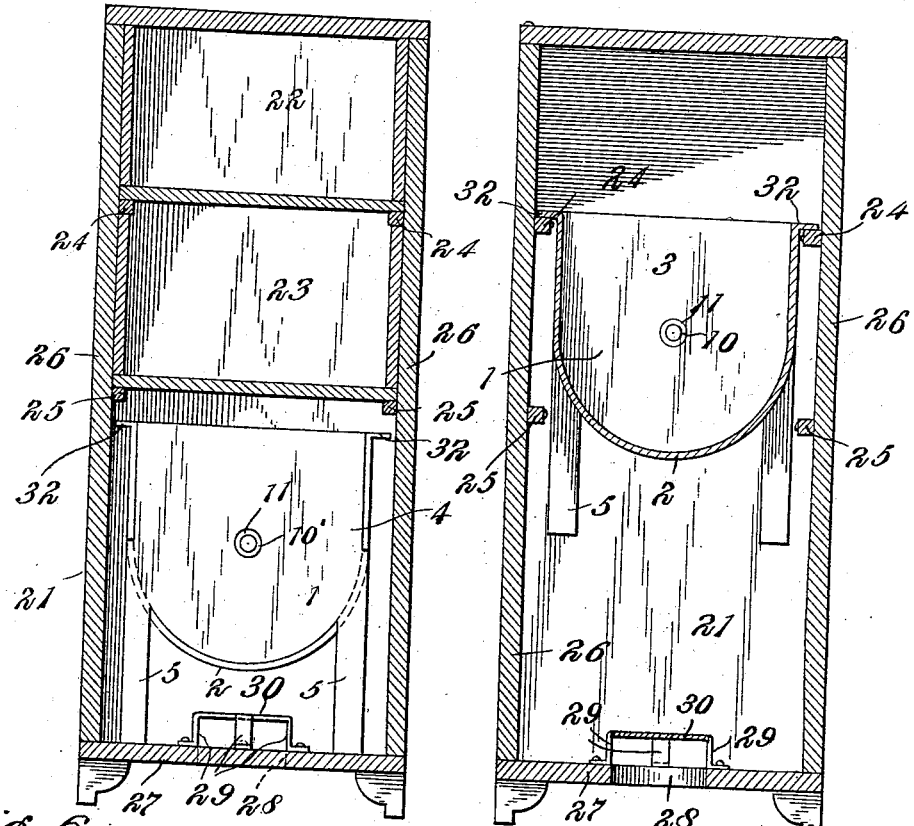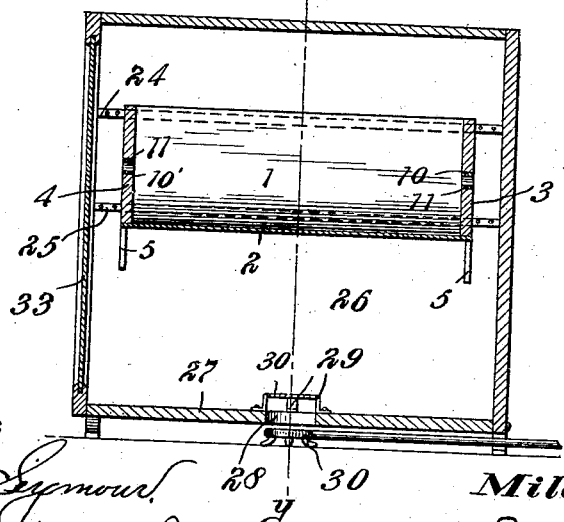

UNITED STATES PATENT OFFICE.

MILO BOWMAN, OF CHICAGO, ILLINOIS, ASSIGNOR OF ONE-HALF TO FRANK J. MONTAGUE, OF CHICAGO, ILLINOIS.

DOUGH MIXER AND RAISER.

No. 917,921.   Specification of Letters Patent.   Patented April 13, 1909.

Application filed July 25, 1908. Serial No. 445,386.

*To all whom it may concern:*

Be it known that I, MILO BOWMAN, a citizen of the United States, residing at Chicago, county of Cook, and State of Illinois, have invented certain new and useful Improvements in Dough Mixers and Raisers, of which the following is a specification.

My invention relates to combination dough-mixers and raisers and the object of my invention is to provide a combination dough-mixer and raiser adapted for use where a comparatively small quantity of bread as for private family use is to be made in distinction to those mixers and raisers used in the making of large quantities of bread as in bakeries.

A further object of my invention is to provide a combination dough-mixer and raiser as mentioned, which will be adapted to thoroughly and effectually mix and raise the dough in the process of making bread without having to transfer the dough from one receptacle to another as is usual.

A further object of my invention is to provide a combination dough-mixer and raiser which will be strong, durable, simple of construction, hence of low cost to manufacture.

With these objects in view, my invention consists generally in a mixing receptacle or vessel provided with longitudinally extending revoluble beating arms detachably secured to said receptacle, and in means for revolving said arms.

My invention further consists in a cabinet or dough-raising receptacle provided with suitable heating means and adapted to receive said dough-mixer containing the just mixed dough after the beating arms and crank handle for revolving the same have been removed from said receptacle.

My invention further consists in certain details of construction and arrangements of parts, all as will be fully described hereinafter and particularly pointed out in the claims.

Figure 1:
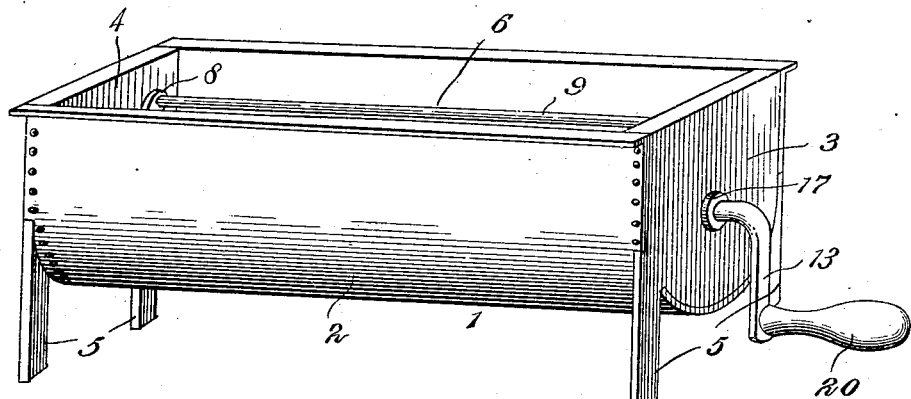
Figure 3:
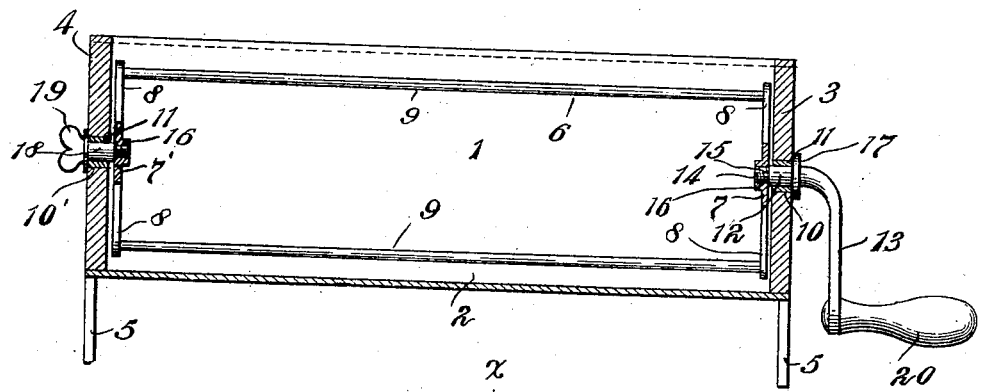
Figure 2:
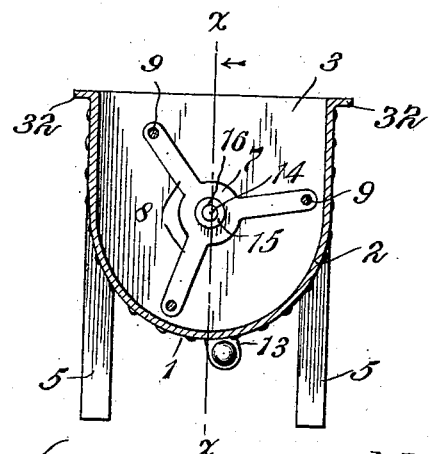

My invention will be more readily understood by reference to the accompanying drawings forming a part of this specification, and in which, Figure 1 is a perspective view of my dough-mixer in its preferred form, Fig. 2 is a vertical transverse section through the same, Fig. 3 is a vertical longitudinal section taken on the line *x—x* of Fig. 2, Fig. 4 is a vertical longitudinal section through the dough-raiser, Fig. 5 is a vertical transverse section taken on the line *y—y* of Fig. 4, and Fig. 6 is a vertical transverse section of my dough-raiser the same containing drawers and dough-mixer.

Referring now to the drawings, 1 indicates the vessel or receptacle portion of my dough-mixer formed of a substantially cylindrical body portion 2 closed at its front and rear ends by the members 3 and 4 respectively, said members being suitably connected and formed of any suitable material preferably of wood or metal. The member 1 is provided with the supporting leg members 5, said members being preferably formed integrally with the members 3 and 4 as clearly shown in Fig. 1 of the drawings. Revolubly mounted in bearings in the end members 3 and 4 of said member 1 is a beating member 6. Said beating member 6 is composed of the similar disk portions 7—7', each of said disk portions being provided with an equal number preferably three as shown in the drawings, of radially extending arms 8. Extending between pairs of said radial arms and having their ends attached preferably by soldering, to the end portions of said radial arms, are the horizontal beating rods proper 9. The operating means and mentioned bearings for said beating member 6 in the ends 3 and 4 of the member 1, are simple but efficient. Said ends 3 and 4 are provided with centrally positioned perforations 10 and 10' respectively, each of said perforations being preferably provided with a bushing 11, although said bushing is not essential. Resting in the bushing in the end 3 is the bearing journal 12 formed preferably integrally with a crank member 13, said journal projecting for an obvious purpose slightly beyond said bushing as clearly shown in Fig. 2. The end portion 14 of said crank 13 is provided with a right-handed thread and is of less diameter than the bearing journal 12, thereby forming a shoulder 15. The disk portion 7 of the beating member 6 is centrally drilled and tapped or threaded as at 16, said threaded aperture being adapted to receive the threaded end 14 of the crank 13, the outer surface of said disk being adapted to rest against the shoulder 15 of the bearing journal 12. The crank 13 is also provided with a shoulder portion 17 which is adapted to rest against the outer surface of the bushing 11 and the end portion 3. A member 18 resting in the end portion 4 of the receptacle 1 is identical with the crank member just described, except that the former is provided with a butterfly head portion 19 to facilitate screwing the same instead of a crank 13. It is obvious that the device may be easily operated by manually revolving a handle portion 20 secured to the crank 13.

21 indicates the cabinet or dough-raiser embodied in my invention. Said member is preferably formed of wood and is of substantially the same width as the mixing member 1 and of a length slightly longer than said member for a purpose hereinafter stated. The upper portion of said member 21 is provided with two removable drawers 22 and 23, said drawers being preferably of substantially the same size and construction and adapted to slide upon the horizontally extending supporting ways 24 and 25, respectively, said ways being suitably secured to the inside of the walls 26 of the member 21. The bottom member 27 of the member 21 is provided with a preferably centrally positioned perforation 28 over which is suitably supported preferably by legs 29 a metal plate 30 as shown in Figs. 4, 5 and 6. Suitable means for heating said dough-raiser 21 are placed beneath said opening 28, a gas-burner 31 representing said means in the drawings.

In using the device, the ingredients of the dough are placed in the dough-mixer receptacle 1 and the beating members 6 revolved by turning the handle 20 attached to the same. After the dough ingredients are thoroughly mixed, the beater, crank and handle are readily detached and removed. The receptacle 1 containing the resulting dough is then placed in the upper portion of the dough-raiser 21. To facilitate so doing, the receptacle 1 is provided with the outwardly extending flanges 32, said flanges being preferably formed integrally with the portion 2 of said receptacle, the supporting ways 24 being adapted to receive said outwardly extending flanges and thereby support said receptacle as clearly shown in Figs. 4 and 5.

As shown in Fig. 4, the dough-raiser is slightly longer than the dough-mixer, so as to facilitate the free passage of heat to the upper portion of the same, bringing said heat for obvious reasons in direct contact with the dough. The front portion of the cabinet is closed by a preferably hinged glass door 23. When not in use the dough-mixer may be kept in the lower portion of the raiser as shown in Fig. 6, the drawers 22 and 23 being adapted to receive the finished bread.

Having described my invention what I claim as new and desire to secure by Letters Patent, is:

1. In a combination dough-mixer and raiser a receptacle provided with a detachable revolubly mounted beating member, means for revolving said beating member, a cabinet member adapted to receive said receptacle, means for heating said cabinet member, substantially as described.

2. In a combination dough-mixer and raiser a receptacle provided with a detachable revolubly mounted beating member, means for revolving said beating member, said beating member consisting of a plurality of horizontally disposed beating rods secured at their ends to a radially armed member, means in said receptacle forming bearings for said beating member, a cabinet member adapted to receive said receptacle, means for heating said cabinet, substantially as described.

3. In a combination dough-mixer and raiser, a semi-cylindrical receptacle, a detachable revolubly mounted beating member, a crank and handle detachably secured to said beating member for manually revolving the same, a cabinet member adapted to receive said receptacle, ways in the upper portion of said receptacle, removable drawers adapted to be slidably supported on said ways, flanges on said first-mentioned receptacle forming means of supporting said receptacle on said ways in the upper portion of said cabinet member, means for heating said cabinet member, substantially as described.

4. In a combination dough-mixer and raiser, a receptacle provided with a detachable revolubly mounted beating member, means for manually revolving the same a cabinet member, ways secured in the upper portion of said member, removable drawers slidably supported on said ways, said first-mentioned receptacle being slightly shorter than but of substantially the same width as said cabinet member, said first-mentioned receptacle being provided with longitudinal outwardly extending flanges, said flanges being adapted to rest upon said ways thereby supporting said receptacle, the lower portion of said cabinet member being adapted to receive said first-mentioned receptacle when said mentioned drawers are in place in said cabinet member, heating means beneath said cabinet member, means in the bottom portion of said member adapted to admit heat from said heating means, substantially as described.

In testimony whereof I have signed my name to this specification in the presence of two subscribing witnesses.

MILO BOWMAN.

Witnesses:
ARTHUR A. OLSON,
HELEN F. LILLIS.